United States Patent [19]

Joshua

[11] Patent Number: 4,523,934
[45] Date of Patent: Jun. 18, 1985

[54] FILTER-DEGASSER

[76] Inventor: Henry Joshua, 256 Woodward Ave., Staten Island, N.Y. 10314

[21] Appl. No.: 586,664

[22] Filed: Mar. 6, 1984

[51] Int. Cl.³ .............................................. B01D 29/00
[52] U.S. Cl. ....................................... 55/189; 55/307; 210/406
[58] Field of Search ...................... 55/38, 55, 159, 189, 55/307; 210/406, 416, 455, 474; 422/101–104; 435/311, 803

[56] References Cited

U.S. PATENT DOCUMENTS

| | | | |
|---|---|---|---|
| 3,437,211 | 4/1969 | Lindsey | 210/406 |
| 3,501,012 | 3/1970 | Ryan | 210/406 |
| 4,251,366 | 2/1981 | Simon et al. | 210/474 X |
| 4,301,010 | 11/1981 | Eddleman et al. | 210/406 |

FOREIGN PATENT DOCUMENTS 751745 7/1956 United Kingdom ................ 210/406

Primary Examiner—Charles Hart
Attorney, Agent, or Firm—Norbert P. Holler

[57] ABSTRACT

An all-TEFLON filter-degasser for removing solids and gases from a solvent. The filter-degasser has a filtering portion, a vacuum application portion downstream of the filtering portion, and a solvent bottle connecting portion. The vacuum application portion includes an externally tapered male member, and the solvent bottle connecting portion includes an internally identically tapered female member. The male member can be inserted into and withdrawn from the female member without requiring any relative rotation therebetween, so that the filter-degasser can be connected hermetically airtight to the solvent bottle likewise without any rotation being required therebetween. This abstract is not to be taken either as a complete exposition or as a limitation of the present invention, however, the full nature and extent of the invention being discernible only by reference to and from the entire disclosure.

15 Claims, 4 Drawing Figures

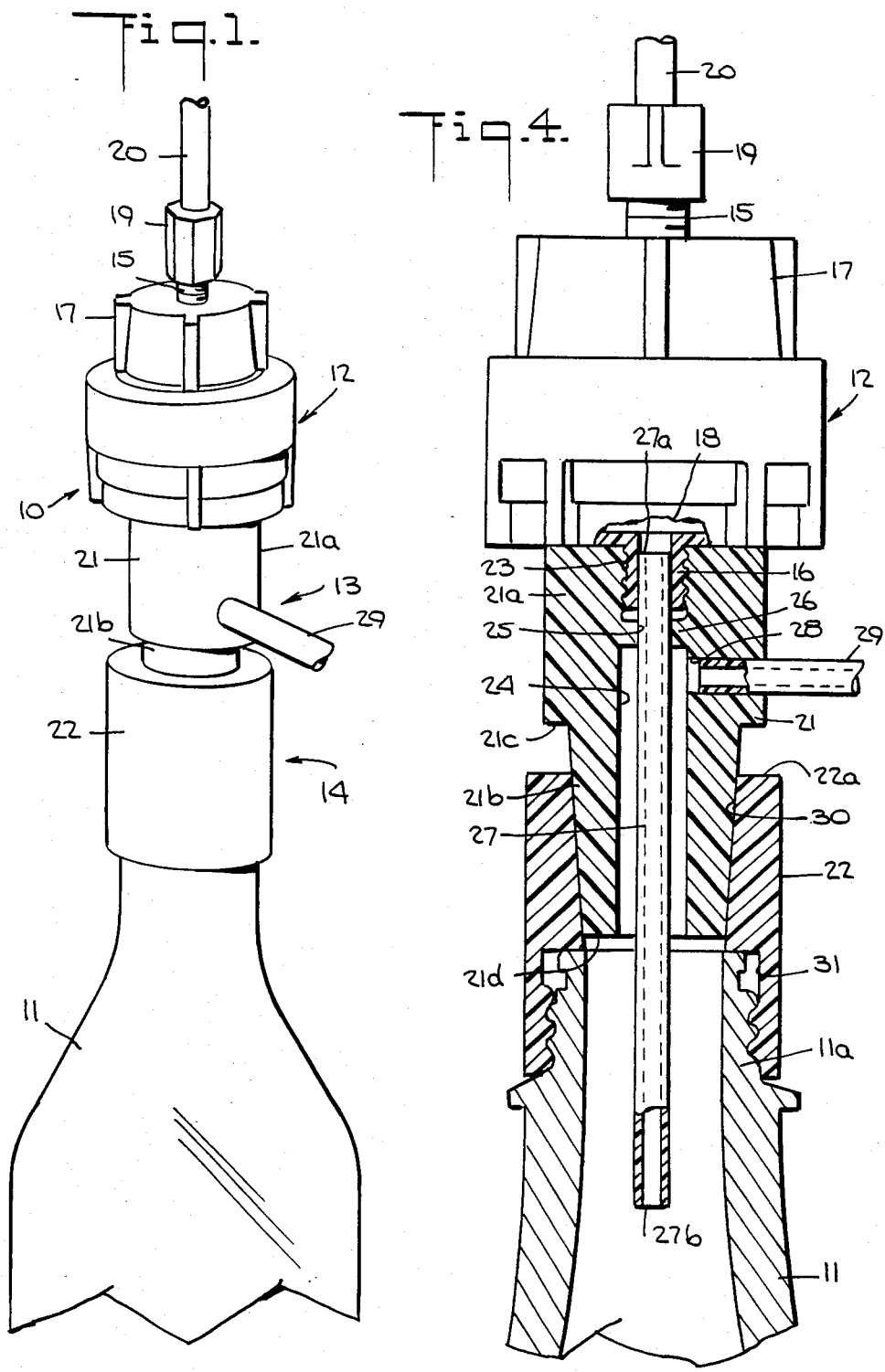

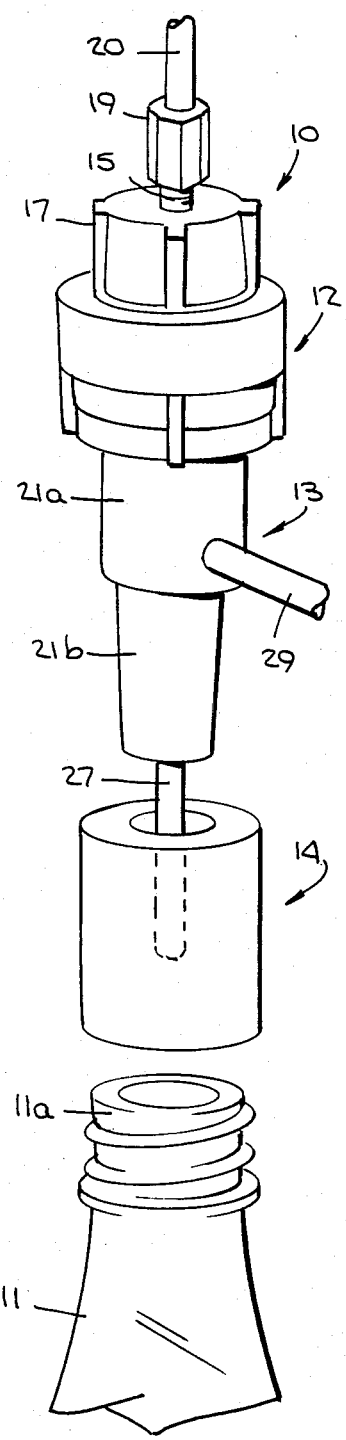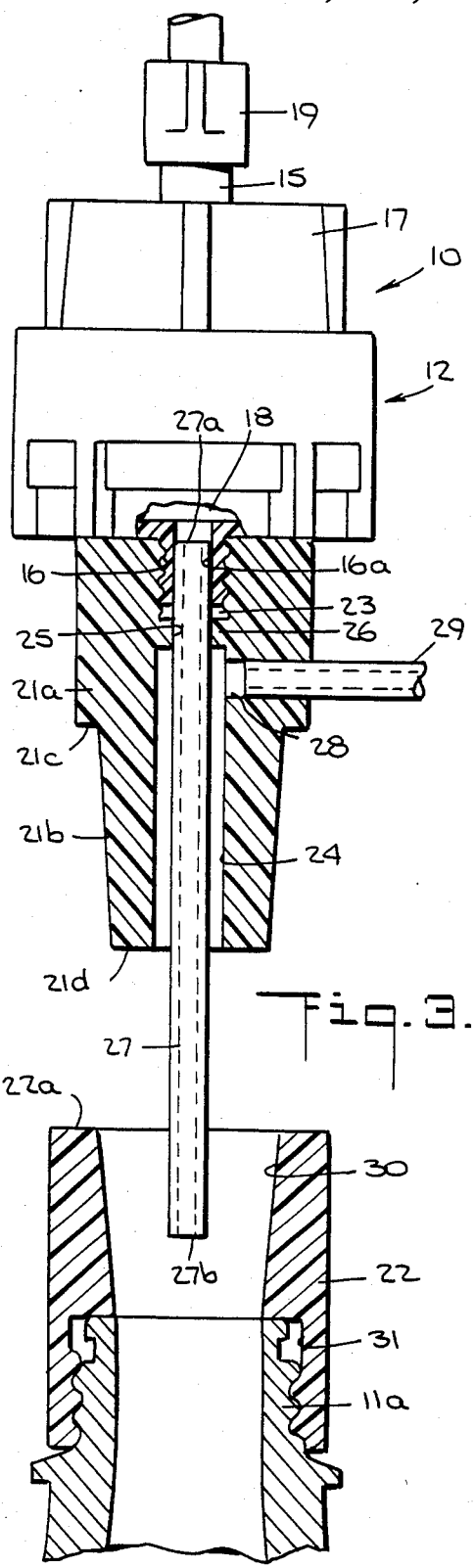

FILTER-DEGASSER

This invention relates to filter-degassers, and in particular to a device of this type which is equipped with novel means for non-rotatably connecting it to and disconnecting it from the neck of a bottle or other receptacle for a liquid being filtered and degassed.

A filter-degasser is an item of scientific or laboratory equipment which is made in its entirety of an inert synthetic plastic material such as polytetrafluoroethylene or the like (available commercially, for example, under the registered trademark TEFLON from E. I. du Pont de Nemours and Company) and which is used for effecting the elimination of entrapped gases and particulates from organic solvents, acids, alkalis, or other liquids preparatory to such liquids being subjected to a laboratory procedure demanding a high degree of purity, e.g. column chromatography. In use, therefore, the filter-degasser is interconnected between a source of the liquid to be purified and a bottle or other receptacle for receiving the purified liquid. For the sake of simplicity, and without any intent to exclude any particular type of liquid or receptacle from the scope of this disclosure, the liquid to be purified will hereinafter be referred to only by the term "solvent" and the receptacle only by the term "solvent bottle."

Insofar as its structure is concerned, such a filter-degasser generally includes a filtering portion, a vacuum application portion and a bottle-connecting portion. Of these, the filtering portion includes a filter holder (for example, one available commercially from Savillex Corporation under the designation "Series 47 Filter Holder") which has an intake fitting or port at one end (the upper end) and a discharge fitting or port at the other end (the lower end). Internally the filter holder houses a filter membrane supported between a pre-filtering reservoir and a post-filtering reservoir. The pre-filtering reservoir communicates with the intake fitting and is located above, i.e. upstream of, the filter membrane, and the post-filtering reservoir communicates with the discharge fitting and is located below, i.e. downstream of, the filter membrane. Exteriorly of the filter holder, both the intake fitting and the discharge fitting are externally threaded and are connected with the aid of TEFLON nuts to respective lengths of feed and discharge tubing, the former of which is in communication with the source of the solvent to be purified, and the latter of which is in communication (as more fully described hereinbelow) with the interior of the solvent bottle.

The vacuum application portion of the filter-degasser includes a short length of pipe having an inner diameter somewhat greater than the outer diameter of the tubing connected to the discharge end of the filter holder. The pipe is externally threaded at its upper end and is connected at its lower end to a screw cap which is adapted to be secured to the neck of the solvent bottle and constitutes the bottle-connecting portion of the filter-degasser. The discharge tubing of the filter holder extends from the discharge fitting down into and at least partly through the interior of the pipe and is tightened to the pipe by a TEFLON nut. Intermediate its ends the pipe is provided with a T-joint or like fitting to enable a suitable source of low pressure or vacuum to be connected to the pipe. The lowermost end of the discharge tubing internally of the pipe preferably is located somewhat below the level of the juncture between the vacuum fitting and the pipe.

A filter-degasser of the type so far discussed is available commercially, for example, from EM Industries, Inc. under the designation "EM SCIENCE HPLC Solvent Filter-Degasser."

As will be understood by those skilled in the art, when a filtering and degassing operation is being performed with the above described equipment, the solvent first enters the pre-filtering reservoir of the filter holder and then passes through the filter membrane, by means of which undesired particulates are removed from the solvent. The filtered solvent then passes via the post-filtering reservoir into the discharge tubing and ultimately exits therefrom essentially drop by drop into the solvent bottle. The solvent, of course, as it emerges from the filter membrane and passes through the discharge tubing and accumulates in the bottle, is subjected to the reduced pressure or vacuum condition established in the vacuum pipe, the bottle and the post-filtering reservoir, so that entrapped gases are extracted from the solvent as it travels to the bottle.

One problem which has been encountered with such a filter-degasser is related to the use of the screw cap. If the pipe constituting a part of the vacuum application portion of the filter-degasser is itself fixed to the screw cap, then in order to apply the cap to or remove it from the bottle, one must either rotate the bottle while holding the filter-degasser stationary or rotate the filter-degasser while holding the bottle stationary. Such an operation obviously is not only somewhat cumbersome, especially if the bottle is filled with a gallon or so of solvent, but entails the risk of damaging the filter-degasser or the bottle and possibly spilling the contents of the bottle. In theory this difficulty could perhaps be overcome if the screw cap itself were swivelly connected to, and hence freely rotatable relative to, the vacuum pipe, so that the cap could be screwed onto the bottle without necessitating a rotation of either the bottle or the filter-degasser, but such a solution in turn tends to make it more difficult to achieve a fully hermetic seal at the juncture between the screw cap and the vacuum pipe.

Another problem which has been encountered with such filter-degassers is related to the use of the TEFLON nuts. These, of course, have to be individually tightened to connect the upper end of the discharge tubing to the bottom end of the filter holder and to tighten the middle region of the discharge tubing to the upper end of the vacuum pipe. The need for such connections, however, makes the assembly and disassembly of the filter-degasser more difficult than it need be, especially since the manipulation of such nuts requires special wrenches, and in general makes the unit also more expensive.

It is an important object of the present invention, therefore, to provide a filter-degasser which is free of the aforesaid drawbacks and disadvantages of the known filter-degasser, is easy to assemble and disassemble, and is safe and easy to use.

Generally speaking, the basic objectives of the present invention are achieved through the provision of a filter-degasser which has, downstream of the filter holder, a vacuum application portion including an externally tapered male member, and a solvent bottle connecting portion including an internally identically tapered female member, the arrangement being such that the male member can be inserted into and withdrawn from the female member without any relative rotation being required between the same and hence between the filter-degasser and the bottle during the interconnection and disconnection thereof.

The foregoing and other objects, characteristics and advantages of the present invention will be more clearly understood from the following detailed description thereof when read in conjunction with the accompanying drawings, in which:

FIG. 1 is a fragmentary, perspective view of a filter-degasser according to the present invention and shows the same connected to a solvent bottle;

FIG. 2 is an exploded view of the structure shown in FIG. 1;

FIG. 3 is a partial vertical section through the structure shown in FIG. 1 but with the filter-degasser not fully connected to the solvent bottle; and FIG. 4 is a view similar to FIG. 3 but shows the filter-degasser fully connected to the solvent bottle.

Referring now to the drawings in greater detail, it will be seen that as a general proposition (FIGS. 1 and 2) the filter-degasser 10 according to the present invention, which is to be connected to a solvent bottle 11, generally has the same three functional parts as the prior art filter-degasser described above, namely a filtering portion 12, a vacuum application portion 13, and a solvent bottle connecting portion 14. Of these, the filtering portion 12 is a conventional filter holder including an intake port or fitting 15, a discharge port or fitting 16 (FIGS. 3 and 4), a pre-filtering reservoir 17 and a post-filtering reservoir 18 (both illustrated only schematically), and a filter membrane (not shown) supported with the aid of a suitable grid (not shown) between the two reservoirs so as to intersect the path of flow of the solvent through the filter holder. The intake port or fitting 15 is externally threaded and connected by means of a nut 19 to one end of a length of feed tubing 20 the other end of which is connected to a source (not shown) of the solvent to be purified. All components of the filter holder 12 are preferably made of TEFLON or a like material inert to the solvent to be purified.

In contrast to the use of the known filter holder in the filtering portion 12, however, the present invention departs from the prior art filter-degasser construction in the vacuum application portion 13 by which the desired low pressure is applied to the filtered solvent for the purpose of degassing the same, and in the solvent bottle connecting portion 14 by which the filter-degasser is connected to the neck of the solvent bottle 11. Broadly viewed, in lieu of the interconnected vacuum pipe and screw cap of the prior art filter-degasser, the filter-degasser 10 of the present invention includes a pair of freely separable and closely interfittable generally tubular members 21 and 22 the former of which constitutes the vacuum application portion and the latter the solvent bottle connecting portion of the filter-degasser. For reasons which will become apparent as the description proceeds, these members will hereinafter be referred to as the male member and the female member, respectively.

As can best be seen from FIGS. 2, 3 and 4, in the illustrated embodiment of the invention the male member 21 has a cylindrical upper section 21a and a somewhat reduced lower section 21b the outer surface of which is downwardly tapered from a maximum diameter at the annular shoulder 21c defining the juncture between the upper and lower sections 21a and 21b to a minimum diameter at the lower end 21d of the member 21. The taper preferably is a standard 10:1 taper (ratio of change of length to change of width) such as is used for scientific glassware. The member 21 is traversed along its full length by an axial bore open at both ends and divided essentially into three sections, an upper section 23, a lower section 24, and an intermediate section 25 of reduced diameter defined by a transverse partition 26 located just below the upper section 23. The upper bore section 23 of the member 21 is internally profiled to define an interlocking means, here shown as a screw thread matched to the external threads on the discharge port or fitting 16 of the filter holder 12, to enable the member 21 to be tightly secured to the said discharge fitting. A TEFLON tube 27 extends through the bore in the member 21, a portion of the tube being received with a tight slidable fit and frictionally retained in the intermediate bore section 25, but the lower bore section 24 is sufficiently wide (it is shown, by way of example only, as being coaxial with and as having a diameter about equal to that of the upper bore section 23) to accommodate the lower portion of the tube 27 preferably with at least some degree of clearance all around the same. The tube 27 further has its upper end 27a in direct communication with the discharge port 16, here shown as effected by means of being received with a tight slidable fit in the interior bore 16a of the discharge fitting, and has its lower end 27b disposed below the lower end 21d of the member 21.

The member 21 is further provided with a bore 28 extending generally transversely from the outside surface of the member 21 to the lower bore section 24, preferably communicating with the latter at a level just below the location of the transverse partition 26. The transverse bore 28 is connected via a tube 29 fitted tightly thereinto with a source of low pressure or vacuum (not shown). In the illustrated embodiment, the length of the tube 27 is shown to be such that, as previously mentioned, it extends to a location below the bottom end 21d of the member 21, but it is within the contemplation of the present invention that the tube 27 could be considerably shorter, although, as will be explained presently, it is preferred that the tube should be long enough to extend at least to a level somewhat below the location of the juncture between the lower bore section 24 and the transverse vacuum bore 28.

The female member 22 is also traversed along its full length by an axial bore open at both ends, but this bore is divided into only two sections, an upper section 30 and a lower section 31. The upper bore section 30 of the member 22 is smooth surfaced and tapers downwardly from a maximum diameter at the upper end 22a of the member 22 to a minimum diameter (preferably one which is not greater than the inner diameter of the neck 11a of the solvent bottle 11) substantially at the upper end of the lower bore section 31. The taper of the bore section 30 is, of course, precisely matched to that of the outside surface of the lower section 21b of the male member 21. The lower bore section 31 of the female member 22 is internally profiled to define an interlocking means, here shown as a screw thread matched to the external threads on the neck 11a of the solvent bottle 11, to enable the member 22 to be tightly secured to the bottle neck.

In use, the installation of the vacuum application portion 13 of the filter-degasser 10 entails only tightly securing the male member 21 to the discharge fitting 16 of the filter holder 12 with the aid of the interlocking means in the upper bore section 23, and placing the tube 27 into direct communication with the discharge port of the filter holder, for example by pushing the tube through the intermediate bore section 25 into the interior bore 16a of the discharge fitting. Concomitantly, the female member 22 is likewise tightly secured to the neck 11a of the solvent bottle with the aid of the interlocking means in the lower bore section 31. To connect the filter-degasser to the bottle it is then only necessary to simply insert the lower section 21b of the male member 21 into the upper bore section 30 of the female member 22 until it is firmly seated therein. No relative rotation between the bottle and the filter-degasser is required, therefore, while these pieces of equipment are being interconnected. It will be apparent, furthermore, that with the male and female members 21 and 22 both being made of TEFLON and with the taper of the outside surface of the lower section 21b of the male member and the taper of the inside surface of the upper bore section 30 of the female member being precisely identical to each other, those surfaces will seat tightly against each other and provide the requisite hermetic seal therebetween when the source of vacuum is activated to evacuate air from and suitably lower the pressure in the bottle. The filtering and degassing of the solvent entering the filter-degasser through the feed tubing 20 and leaving the filter-degasser through the discharge tube 27 is, of course, effected as in the prior art filter-degasser. In this regard, the reason for disposing the lower end 27b of the discharge tube 27 below the level of the vacuum bore 28 will now be clear; it is to ensure that none of the solvent exiting from the tube 27 will be drawn into the vacuum line 29.

The enhanced simplicity and advantages of the arrangement according to the present invention for connecting a filter-degasser to a solvent bottle, from the standpoints of cost of manufacture, ease of manipulation, and safety to both equipment and personnel, will be readily apparent from the foregoing description.

It will also be understood that the foregoing description of a preferred embodiment of the present invention is for purposes of illustration only, and that the various structural and operational features herein disclosed are susceptible to a number of modifications and changes none of which entails any departure from the spirit and scope of the present invention as defined in the hereto appended claims. Merely by way of example, if a solvent bottle is used which has an inside neck surface capable of accommodating the tapered lower section 21b of the male member 21 directly, then the use of the female member 22 could possibly be dispensed with. Also, although the male member 21 has been described as being a separate element secured to the discharge fitting 16 by screw threads (or any other type of interlocking means such as press fit, set screws, pin and slot arrangements, etc.) the male member could be preformed as an integral part of the post-filtering reservoir 18, in which case there would be no need for a discharge fitting and the upper bore section 23 would simply be a continuation of the reduced diameter bore section 25.

I claim:

1. A solvent filter-degasser adapted to be connected to a solvent bottle and having a filtering portion and a vacuum application portion, with said filtering portion including a filter holder having intake and discharge ports and a filter membrane intersecting the path of flow of solvent between said ports;

wherein the improvement comprises that:
(a) said vacuum application portion comprises a generally tubular member having a first bore extending therethrough and open at both ends, said first bore having
   (i) an upper section profiled to define interlocking means for tightly securing said member to said discharge port of said filter holder,
   (ii) an intermediate section with a smooth wall surface, and
   (iii) a lower section the width of which is greater than the diameter of said intermediate section,
and a tube extending through said first bore and having an outer diameter substantially equal to said diameter of said intermediate section of said first bore, said tube being frictionally and tightly received and retained in said intermediate section of said first bore and having its upper end in direct communication with said discharge port of said filter holder for receiving solvent exiting therefrom, said member further having a second bore therein extending from the outside surface of said member to and communicating with said lower section of said first bore for connecting the region of said lower section of said second bore surrounding said tube to a source of vacuum, and at least the lower part of said member having an outside surface which tapers from a maximum diameter to a minimum diameter at the lower end of said member,
(b) whereby said lower part of said member can be inserted into and withdrawn from the neck of said solvent bottle or an adjunct thereof, and be received therein with a smooth tight fit, without requiring relative rotation between said member and said solvent bottle or adjunct thereof.

2. A filter-degasser according to claim 1, wherein said tube is sufficiently long to dispose the lower end thereof at a level somewhat lower than that of the juncture between said second bore and said lower section of said first bore in said member.

3. A filter-degasser according to claim 2, wherein said tube is sufficiently long to dispose said lower end thereof at a level below said lower end of said member.

4. A solvent filter-degasser having a filtering portion, a vacuum application portion and a solvent bottle connecting portion, with said filtering portion including a filter holder having intake and discharge ports and a filter membrane intersecting the path of flow of solvent between said ports;

wherein the improvement comprises that:
(a) said solvent bottle connecting portion comprises a first generally tubular member having a first bore extending therethrough and open at both ends, said first bore having
   (i) a lower section profiled to define first interlocking means for tightly securing said first member to the neck of said solvent bottle and
   (ii) an upper section with a smooth wall surface which tapers from a maximum diameter at the upper end of said first member to a minimum diameter intermediate said upper end of said first member and said lower bore section; and
(b) said vacuum application portion comprises a second generally tubular member having a second bore extending therethrough and open at both ends, said second bore having (i) an upper section profiled to define second interlocking means for tightly securing said second member to said discharge port of said filter holder, (ii) an intermediate section with a smooth wall surface, and (iii) a lower section the width of which is greater than the diameter of said intermediate section, and a tube extending through said second bore and having an outer diameter substantially equal to said diameter of said intermediate section of said second bore, said tube being frictionally and tightly received and retained in said intermediate section of said second bore and having its upper end in direct communication with said discharge port of said filter holder for receiving solvent exiting therefrom, said second member further having a third bore therein extending from the outside surface of said second member to and communicating with said lower section of said second bore for connecting the region of said lower section of said second bore surrounding said tube to a source of vacuum, and at least the lower part of said second member having an outside surface which tapers from a maximum diameter to a minimum diameter at the lower end of said second member at a rate identical with that of the taper of said upper section of said first bore in said first member, (c) whereby after said first member has been connected to the neck of said solvent bottle with the aid of said first interlocking means, said lower part of said second member can be inserted into and withdrawn from said upper section of said first bore in said first member, and be received therein with a smooth tight fit, without requiring relative rotation between said first and second members and hence between the filter-degasser and the solvent bottle.

5. A filter-degasser according to claim 4, wherein said tube is sufficiently long to dispose the lower end thereof at a level somewhat lower than that of the juncture between said third bore and said lower section of said second bore in said second member.

6. A filter-degasser according to claim 5, wherein said tube is sufficiently long to dispose said lower end thereof at a level below said lower end of said second member.

7. A filter-degasser according to claim 4, wherein said discharge port of said filter holder has an interior bore the diameter of which is substantially equal to said outer diameter of said tube, and the upper end region of said tube is frictionally and tightly received in said interior bore of said discharge port.

8. A filter-degasser according to claim 7, wherein said tube is sufficiently long to dispose the lower end thereof at a level somewhat lower than that of the juncture between said third bore and said lower section of said second bore in said second member.

9. A filter-degasser according to claim 8, wherein said tube is sufficiently long to dispose said lower end thereof at a level below said lower end of said second member.

10. A solvent filter-degasser adapted to be connected to a solvent bottle and having a filtering portion and a vacuum application portion, with said filtering portion including a filter holder having a filter membrane intersecting the path of flow of solvent through said filter holder;

wherein the improvement comprises that:

(a) said vacuum application portion comprises a generally tubular member secured to a portion of said filter holder and having a first bore extending therethrough and open at both ends, said first bore having (i) an upper section and (ii) a lower section the width of which is greater than the diameter of said upper section, and a tube extending through said first bore and having an outer diameter substantially equal to said diameter of said upper section of said first bore, said tube being frictionally and tightly received and retained in said upper section of said first bore and having its upper end in direct communication with the interior of said filter holder for receiving solvent exiting therefrom, said member further having a second bore therein extending from the outside surface of said member to and communicating with said lower section of said first bore for connecting the region of said lower section of said second bore surrounding said tube to a source of vacuum, and at least the lower part of said member having an outside surface which tapers from a maximum diameter to a minimum diameter at the lower end of said member, (b) whereby said lower part of said member can be inserted into and withdrawn from the neck of said solvent bottle or an adjunct thereof, and be received therein with a smooth tight fit, without requiring relative rotation between said member and said solvent bottle or adjunct thereof.

11. A filter-degasser according to claim 10, wherein said tube is sufficiently long to dispose the lower end thereof at a level somewhat lower than that of the juncture between said second bore and said lower section of said first bore in said member.

12. A filter-degasser according to claim 11, wherein said tube is sufficiently long to dispose said lower end thereof at a level below said lower end of said member.

13. A solvent filter-degasser having a filtering portion, a vacuum application portion and a solvent bottle connecting portion, with said filtering portion including a filter holder having a filter membrane intersecting the path of flow of solvent through said filter holder;

wherein the improvement comprises that:

(a) said solvent bottle connecting portion comprises a first generally tubular member having a first bore extending therethrough and open at both ends, said first bore having (i) a lower section profiled to define interlocking means for tightly securing said first member to the neck of said solvent bottle and (ii) an upper section with a smooth wall surface which tapers from a maximum diameter at the upper end of said first member to a minimum diameter intermediate said upper end of said first member and said lower bore section, and (b) said vacuum application portion comprises a second generally tubular member having a second bore extending therethrough and open at both ends, said second bore having (i) an upper section and (ii) a lower section the width of which is greater than the diameter of said upper section, and a tube extending through said second bore and having an outer diameter substantially equal to said diameter of said upper section of said second bore, said tube being frictionally and tightly received and retained in said upper section of said second bore and having its upper end in direct communication with the interior of said filter holder for receiving solvent exiting therefrom, said second member further having a third bore therein extending from the outside surface of said second member to and communicating with said lower section of said second bore for connecting the region of said lower section of said second bore surrounding said tube to a source of vacuum, and at least the lower part of said second member having an outside surface which tapers from a maximum diameter to a minimum diameter at the lower end of said second member at a rate identical with that of the taper of said upper section of said first bore in said first member, (c) whereby after said first member has been connected to the neck of said solvent bottle with the aid of said interlocking means, said lower part of said second member can be inserted into and withdrawn from said upper section of said first bore in said first member, and be received therein with a smooth tight fit, without requiring relative rotation between said first and second members and hence between the filter-degasser and the solvent bottle.

14. A filter-degasser according to claim 13, wherein said tube is sufficiently long to dispose the lower end thereof at a level somewhat lower than that of the juncture between said third bore and said lower section of said second bore in said second member.

15. A filter-degasser according to claim 14, wherein said tube is sufficiently long to dispose said lower end thereof at a level below said lower end of said second member.

* * * * *